US008727574B2

(12) United States Patent
Simchak et al.

(10) Patent No.: US 8,727,574 B2
(45) Date of Patent: May 20, 2014

(54) LED LIGHT MODULE WITH LIGHT PIPE AND REFLECTORS

(75) Inventors: Jeffrey Simchak, Dexter, MI (US); Jeremy Wong, Royal Oak, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 13/238,083

(22) Filed: Sep. 21, 2011

(65) Prior Publication Data
US 2012/0140481 A1 Jun. 7, 2012

Related U.S. Application Data

(60) Provisional application No. 61/384,899, filed on Sep. 21, 2010.

(51) Int. Cl.
*F21V 7/09* (2006.01)
*F21V 7/07* (2006.01)
*F21V 7/06* (2006.01)
*G02B 6/36* (2006.01)

(52) U.S. Cl.
CPC ... *F21V 7/09* (2013.01); *F21V 7/07* (2013.01); *F21V 7/06* (2013.01); *G02B 6/36* (2013.01)
USPC .. 362/299; 362/296.07; 362/298; 362/311.02

(58) Field of Classification Search
CPC ............... F21V 7/07; F21V 7/06; F21V 7/09; G02B 6/36; G02B 6/42
USPC .......... 362/296.07, 296.08, 249.02, 235, 236, 362/311.02–311.12, 555
See application file for complete search history.

(56) References Cited

U.S. PATENT DOCUMENTS

| | | | |
|---|---|---|---|
| 3,772,506 A | 11/1973 | Junginger | |
| 4,084,215 A * | 4/1978 | Willenbrock | 362/470 |
| 5,206,799 A * | 4/1993 | Tiesler | 362/296.04 |
| 6,350,041 B1 * | 2/2002 | Tarsa et al. | 362/231 |
| 6,356,700 B1 | 3/2002 | Strobl | |

(Continued)

FOREIGN PATENT DOCUMENTS

| | | |
|---|---|---|
| EP | 1182395 A2 | 2/2002 |
| EP | 1610054 A2 | 12/2005 |

(Continued)

OTHER PUBLICATIONS

International Search Report mailed on Mar. 9, 2012 (PCT/US2011/052479).

*Primary Examiner* — Diane Lee
*Assistant Examiner* — Kenny C Sokolowski
(74) *Attorney, Agent, or Firm* — Robert L. Stearns; Dickinson Wright, PLLC

(57) ABSTRACT

An economical LED light module configured to emit a uniform pattern of light from a single LED utilizing a minimal amount of energy and exhibiting a long and useful life is provided. The LED light module includes a main hyperbolic reflector and a plug receptacle having an electrical connector configured for electrical communication with a power source. A LED is mounted in electrical communication with the electrical connector. An elongate light pipe extends between a light receiving end configured to receive light emitted from the LED and a light emitting end. The light emitting end has a parabolic reflector positioned concentrically about a focal point of the hyperbolic reflector.

12 Claims, 1 Drawing Sheet

(56) References Cited

U.S. PATENT DOCUMENTS

| | | |
|---|---|---|
| 6,783,250 B2 | 8/2004 | Janssen |
| 6,787,999 B2 | 9/2004 | Stimac et al. |
| 6,796,698 B2 * | 9/2004 | Sommers et al. ............. 362/555 |
| 6,836,576 B2 | 12/2004 | Li |
| 6,949,772 B2 | 9/2005 | Shimizu et al. |
| 6,991,355 B1 * | 1/2006 | Coushaine et al. ........... 362/555 |
| 7,059,748 B2 | 6/2006 | Coushaine et al. |
| 7,075,224 B2 | 7/2006 | Coushaine |
| 7,092,612 B1 | 8/2006 | Coushaine |
| 7,110,656 B2 | 9/2006 | Coushaine et al. |
| 7,168,839 B2 | 1/2007 | Chinniah et al. |
| 7,275,849 B2 * | 10/2007 | Chinniah et al. ............. 362/555 |
| 7,293,906 B2 | 11/2007 | Mok et al. |
| 7,322,718 B2 | 1/2008 | Setomoto et al. |
| D586,751 S | 2/2009 | Coushaine et al. |
| 7,503,680 B2 | 3/2009 | Desvaud |
| D610,543 S | 2/2010 | Coushaine |
| D610,544 S | 2/2010 | Coushaine et al. |
| D610,545 S | 2/2010 | Coushaine et al. |
| D610,991 S | 3/2010 | Coushaine et al. |
| D619,964 S | 7/2010 | Coushaine et al. |
| 7,862,212 B2 * | 1/2011 | Huang et al. ................. 362/299 |
| 7,922,364 B2 * | 4/2011 | Tessnow et al. .............. 362/294 |
| 2003/0063476 A1 * | 4/2003 | English et al. ................ 362/545 |
| 2003/0219207 A1 * | 11/2003 | Guy ................................ 385/49 |
| 2005/0281047 A1 | 12/2005 | Coushaine et al. |
| 2006/0013000 A1 | 1/2006 | Coushaine et al. |
| 2007/0121326 A1 | 5/2007 | Nall et al. |
| 2009/0034278 A1 | 2/2009 | Tessnow et al. |
| 2009/0129079 A1 | 5/2009 | Grotsch et al. |
| 2009/0161372 A1 | 6/2009 | Fay et al. |
| 2009/0251918 A1 | 10/2009 | Engl et al. |
| 2009/0296417 A1 | 12/2009 | Luo et al. |

FOREIGN PATENT DOCUMENTS

| | | |
|---|---|---|
| EP | 1645794 A2 | 4/2006 |
| FR | 2739524 | 4/1997 |
| GB | 2089955 A | 6/1982 |
| JP | 2002100217 A | 4/2002 |
| KR | 20040066762 | 7/2004 |
| KR | 20040074478 | 8/2004 |
| KR | 20100044632 | 4/2010 |
| WO | 2005003624 | 1/2005 |
| WO | 2006060392 A2 | 6/2006 |

* cited by examiner

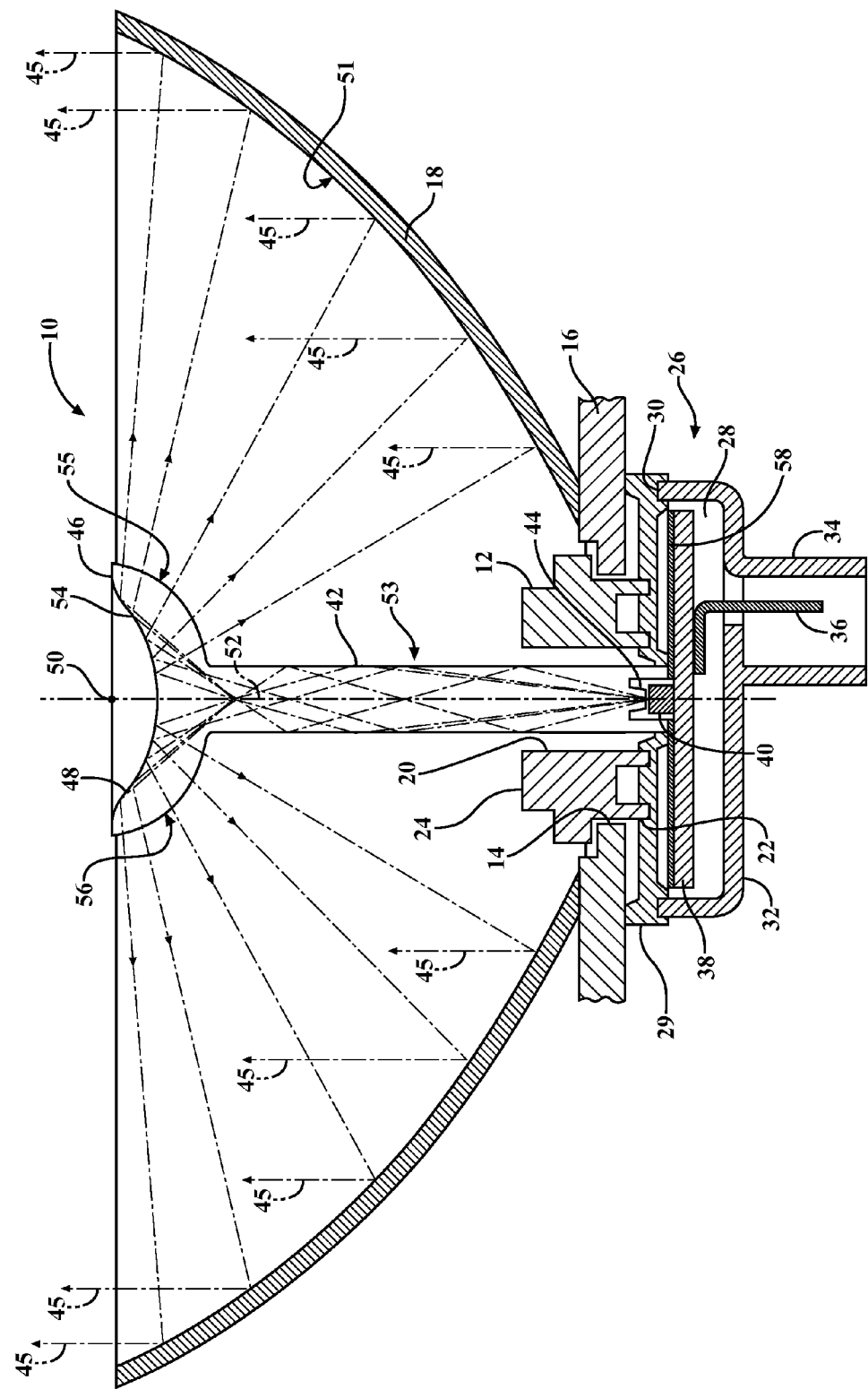

LED LIGHT MODULE WITH LIGHT PIPE AND REFLECTORS

CROSS-REFERENCE TO RELATED APPLICATION

This application claims the benefit of U.S. Provisional Application Ser. No. 61/384,899, filed Sep. 21, 2010, which is incorporated herein by reference in its entirety.

BACKGROUND OF THE INVENTION

1. Technical Field

This invention relates generally to light emitting modules, and more particularly to light emitting modules having a light emitting diode (LED) configured in optical communication with a light pipe.

2. Related Art

It is well known to utilize light modules having incandescent bulbs in vehicle applications. While incandescent bulbs have exhibited a long and successful reign in vehicle applications, they are known to use a relatively large supply of energy and exhibit a relatively short life in use. Efforts to combat these and other problems associated with incandescent bulbs include incorporating LEDs into light modules in lieu of incandescent bulbs. Unfortunately, current modules incorporating LEDs, although requiring less energy and exhibiting a increased useful life, also have drawbacks. For example, LED light modules typically use a multitude of LEDs, such as eight or more, in order to obtain the emitted light pattern desired, which in turn, requires increasing the amount of energy over each LED. In addition, the current LED light modules suffer from emitted light inefficiencies. The inefficiencies are due, at least in part, to the inability of known configurations and arrangements of reflectors to reflect a uniform light pattern of the light emitted directly from the LEDs toward the surrounding area desired to be illuminated. As such, although an individual LED typically exhibits a longer useful life and requires less energy than a single incandescent bulb, the need to incorporate multiple LEDs into a light module negates the benefits of using LEDs in lieu of incandescent bulbs. Accordingly, efforts are still needed to construct a LED light module that requires less energy, while at the same time being able to emit a uniform light pattern over the desired surrounding area to be illuminated.

SUMMARY OF THE INVENTION

An economical LED light module configured to emit a uniform pattern of light from a single LED utilizing a minimal amount of energy and exhibiting a long and useful life is provided. The LED light module includes a main hyperbolic reflector and a plug receptacle having an electrical connector configured for electrical communication with a power source. A LED is mounted in electrical communication with the electrical connector. An elongate light pipe extends between a light receiving end configured to receive light emitted from the LED and a light emitting end. The light emitting end has a parabolic reflector positioned concentrically about a focal point of the hyperbolic reflector.

In accordance with another aspect of the invention, the housing of the LED light module has an opening wherein a socket is configured for receipt within the opening. The socket is fixed to the hyperbolic reflector and has a through passage configured for receipt of the light pipe therethrough.

In accordance with another aspect of the invention, the LED light module includes a base having one end operably attached to the socket and another end providing a plug receptacle about the electrical connector.

In accordance with another aspect of the invention, the base has an inner cavity with a PCB disposed in the inner cavity in electrical communication with the electrical connector and the LED.

In accordance with another aspect of the invention, the light emitting end has a concave parabolic surface and a convex reflector surface.

In accordance with another aspect of the invention, the light pipe is a solid, non-hollowed piece of visible light transmitting material.

In accordance with another aspect of the invention, the parabolic reflector is a metallized coating.

In accordance with yet another aspect of the invention, the parabolic reflector is a reflective insert attached to the concave parabolic surface.

The module can be constructed for use in a wide variety of applications, such as, by way of example and without limitation, tail lamps, turn indicators, day-time running lamps, and CHMSL's. The module is economical in manufacture and design, and exhibits a long life in use.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

FIG. 1 is a cross-sectional view of a LED light pipe module constructed in accordance with one aspect of the invention.

DETAILED DESCRIPTION OF PRESENTLY PREFERRED EMBODIMENTS

Referring in more detail to the drawings, FIG. 1 illustrates a LED light pipe module, referred to hereafter as light module or simply module 10, constructed in accordance with one aspect of the invention. The module 10 includes a socket 12 configured for receipt within an opening 14 of a housing 16. The housing 16 has a main hyperbolic reflector 18 fixed thereto. The socket 12 has a through passage 20 extending between a proximal end 22 and a distal end 24. The module 10 further includes a base 26 having an inner cavity 28 bounded by opposite ends 30, 32. One end 30 of the base 26 is operably attached to the proximal end 22 of the socket 12, such as via a seal member 29, and the other end 32 is configured to provide a plug receptacle 34. An electrical connector 36 is disposed at least in part in the plug receptacle 34 and a printed circuit board (PCB) 38 is disposed in the inner cavity 28 in electrical communication with the electrical connector 36.

Further, a single LED 40 is mounted in electrical communication with the PCB 38 and also in electrical communication with the electrical connector 36. The module 10 further includes an elongate light pipe 42 extending through the through passage 20 of the socket 12 from a light receiving end 44 configured to receive light 45 emitted from the LED 40 to a light emitting end 46 suspended above the hyperbolic reflector 18. The light emitting end 46 is has an integral parabolic reflector 48 configured concentrically about a focal point 50 of the hyperbolic reflector 18. As such, the reflector 48 reflects light 45 emitted from the LED 40 uniformly along focal lines extending between the focal point 50 and a reflective surface 51 of the hyperbolic reflector 18. Upon reflecting off the reflective surface 51 of the hyperbolic reflector 18, the light 45 is reflected uniformly generally parallel to a longitudinal central axis 52 of the light pipe 42 to a surrounding area intended to be illuminated.

The light pipe 42 can be provided as a solid, non-hollowed piece of visible light transmitting material, e.g. polycarbonate, that extends over an elongate, generally cylindrical portion 53 coaxially with the central axis 52. The cylindrical portion 53 has a relatively small diameter that extends through the through passage 20 of the socket 12. Thus, the socket 12 and its through passage 20 can be provided having a small envelope. As such, the opening 14 in the housing 16, and also the hyperbolic reflector 18, can be provided with a minimally sized opening therethrough. Accordingly, the area of the reflective surface 51 of the hyperbolic reflector 18 is maximized, with little of the reflector surface 51 being occupied by and obstructed by the light pipe 42 and the socket 12.

The light pipe 42 provides flexibility of design and its configuration provides an increased focal length. The light emitting end 46 has an enlarged, generally bowl shaped portion 55 atop the light pipe cylindrical portion 53, as shown in cross-section in FIG. 1. The bowl shaped portion 55 has an uppermost parabolic concave surface 54 on which the parabolic reflector 48 is fixed, and a lowermost convex surface 56 flared outwardly from the cylindrical portion 53. In use, the light waves 45 travel upwardly from the LED 40 through the cylindrical portion 53 to the light emitting end 46 without exiting the cylindrical portion 53. The light waves 45 are free to travel generally along the cylindrical portion 53 to the reflector 48, and also upwardly through the bowl shaped portion 55 to radially outwardly lying portions of the reflector 48. As such, the light waves 45 emitted from the LED 40 are able to impinge the full parabolic surface of the reflector 48 facing the reflective surface 51 of the hyperbolic reflector 18, such that the reflected light waves 45 are uniformly distributed from the reflector 48 radially outwardly and downwardly to impinge the full reflective surface 51 of the hyperbolic reflector 18. As such, the reflected light waves 45 appear as emanating from a single point light source when then reflected off the reflective surface 51 of the hyperbolic reflector 18 to the surrounding area desired to illuminated.

The parabolic reflector 48 can be provided as a metallized coating bonded on the uppermost concave surface 54 of the bowl shaped portion 55. Otherwise, the parabolic reflector 48 can be provided as a separate reflective insert that is attached to the concave parabolic surface 54. Accordingly, manufacturing options are available to construct the parabolic reflector 48.

The base 26 can be provided as a sealed unit, such that the cavity 28 is sealed via the base 26 and the cover seal member 29, though allowing ready access to the LED 40 when desired via removal of the cover seal member 29, such as during service to replace the LED 40. In addition, although only having a single LED 40, a heat absorbing piece of metal 58 can be provided in the cavity 28 to absorb heat generated by the LED 40 in use.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:
1. A LED light module, comprising:
a housing presenting an outer surface and an opening;
a socket received in said opening of said housing, said socket presenting a through passage;
a main hyperbolic reflector including a base end disposed radially outwardly of said socket and fixed to said outer surface of said housing, said base end of said main hyperbolic reflector presenting an opening surrounding said socket, and said main hyperbolic reflector including a reflector surface extending upwardly from said base end;
an electrical connector configured for electrical communication with a power source;
a LED mounted in electrical communication with said electrical connector;
an elongate light pipe disposed in said through passage of said socket and extending between a light receiving end configured to receive light emitted from said LED and a light emitting end, said light emitting end having a parabolic reflector positioned concentrically about a focal point of said hyperbolic reflector;
a base operably attached to said socket; and
a cover seal member operably attaching said base and said socket, said cover seal member extending between said elongate light pipe and said base and spacing said elongate light pipe from said socket.

2. The LED light module of claim 1 wherein said light emitting end has a concave parabolic surface and a convex surface.

3. The LED light module of claim 2 wherein said parabolic reflector is a metallized coating on said concave parabolic surface.

4. The LED light module of claim 2 wherein said parabolic reflector is a reflective insert attached to said concave parabolic surface.

5. The LED light module of claim 1 wherein said elongate light pipe is a solid, non-hollowed piece of visible light transmitting material.

6. The LED light module of claim 1 wherein said elongate light pipe has an elongate cylindrical portion located between said light receiving end and said light emitting end.

7. The LED light module of claim 1 wherein said base has one end operably attached to said socket and another end providing a plug receptacle about said electrical connector.

8. The LED light module of claim 7 wherein said base has an inner cavity and further comprising a PCB disposed in said inner cavity in electrical communication with said electrical connector and said LED.

9. The LED light module of claim 7 wherein said base is configured in sealed attachment to said socket.

10. The LED light module of claim 1 wherein said socket includes a side wall presenting said through passage, and said elongate light pipe is spaced from said side wall.

11. The LED light module of claim 1 wherein said elongate light pipe has a cylindrical portion and a bowl-shaped portion atop said cylindrical portion, said cylindrical portion has a constant outside diameter from said light receiving end to said bowl-shaped portion, and said bowl-shaped portion includes said light emitting end.

12. An LED light module, comprising:
a housing presenting an outer surface and an opening;
a socket received in said opening of said housing, wherein said socket includes a side wall presenting a through passage;
an electrical connector configured for electrical communication with a power source;
a LED mounted in electrical communication with said electrical connector;
a base having one end operably attached to said socket and an inner cavity;

a PCB disposed in said inner cavity of said base and in electrical communication with said electrical connector and said LED;

a cover seal member operably attaching said one end of said base to said socket and sealing said inner cavity;

a main hyperbolic reflector including a base end disposed radially outwardly of said socket and fixed to said outer surface of said housing, said base end of said main hyperbolic reflector presenting an opening surrounding said socket, and said main hyperbolic reflector including a reflector surface extending upwardly from said base end;

an elongate light pipe disposed in said through passage of said socket and extending between a light receiving end configured to receive light emitted from said LED and a light emitting end, said elongate light pipe having a cylindrical portion and a bowl-shaped portion atop said cylindrical portion, said cylindricaln a constant outside diameter from said light receiving end to said bowl-shaped portion, said bowl-shaped portion including said light emitting end having a parabolic reflector positioned concentrically about a focal point of said hyperbolic reflector;

said cover seal member extending between said elongate light pipe and said one end of said base, and said cover seal member spacing said elongate light pipe from said wall of said socket.

* * * * *

UNITED STATES PATENT AND TRADEMARK OFFICE
CERTIFICATE OF CORRECTION

| | | |
|---|---|---|
| PATENT NO. | : 8,727,574 B2 | Page 1 of 1 |
| APPLICATION NO. | : 13/238083 | |
| DATED | : May 20, 2014 | |
| INVENTOR(S) | : Simchak et al. | |

It is certified that error appears in the above-identified patent and that said Letters Patent is hereby corrected as shown below:

In the Drawings:

Drawing sheet 1 of 1, insert --FIG. 1--

Signed and Sealed this
Twenty-first Day of October, 2014

Michelle K. Lee
*Deputy Director of the United States Patent and Trademark Office*